Figure 1:
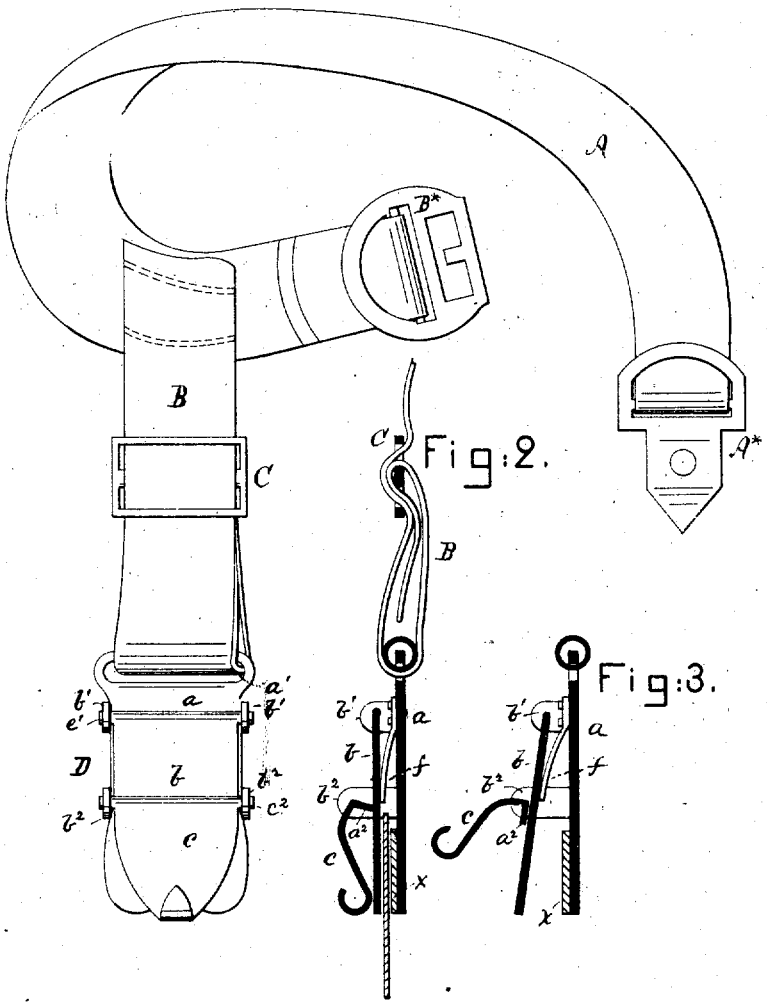

W. S. WARDWELL,

Assignor to G. FROST, G. H. PHELPS, & G. A FROST.

Garter.

No. 9,143. Reissued April 6, 1880.

Witnesses

L. F. Connor.

Jos. P. Livermore.

Inventor.

William S Wardwell by Crosby & Gregory Attys.

UNITED STATES PATENT OFFICE.

WILLIAM S. WARDWELL, OF RUTLAND, VERMONT, ASSIGNOR TO GEORGE FROST, GEORGE H. PHELPS, AND GEORGE A. FROST.

GARTER.

SPECIFICATION forming part of Reissued Letters Patent No. 9,143, dated April 6, 1880.

Original No. 152,200, dated June 16, 1874. Application for reissue filed February 25, 1880.

*To all whom it may concern:*

Be it known that I, WILLIAM S. WARDWELL, formerly of the city, county, and State of New York, but now of Rutland, Rutland county, Vermont, have invented certain Improvements in Stocking-Suspenders, of which the following is a specification.

This invention is designed to furnish a simple, cheap, and efficient device for suspending stockings in lieu of the ordinary garter, and for other analogous purposes.

It consists in certain novel combinations of parts whereby the desired result is effectually accomplished.

Figure 1 is a side view of a stocking-suspender made according to my invention. Fig. 2 is a longitudinal section of the stocking-engaging device or clamp and pendent strap, showing the clamp in closed position. Fig. 3 is a similar view of said stocking-engaging clamp, showing the parts open.

A is a band of elastic webbing, designed to be passed around the leg either above or below the knee, but at some little space above the top of the stocking, and to be there held by the usual fastening devices, composed of the tongue A* and buckle B*. Supported by this band A at any desired point is the pendent elastic strap B, made adjustable as to its length by having its lower portion looped in and through the clasp C, as more plainly represented in Fig. 2.

The stocking engaging and holding device is shown as a clamp, D, composed of a flat plate, $a$, having a slot, $a'$, to receive the looped part of and attach the clamp to the strap.

The plate $a$ is provided with two sets, $b'$ $b^2$, of lugs or ears, situated at right angles to its inner face in such manner that the one set, $b'$, provides bearings for the pivots $e'$ of a clamping-plate, $b$, while the other, $b^2$, provides bearings for the pivots $c^2$ of a lever, $c$, the inner edge, $a^2$, of which is turned inward at an angle to its main length, as shown in Figs. 2 and 3, to exert a cam-like action upon the clamping-plate, as hereinafter fully set forth.

The pivots $c^2$ of the lever and those, $e'$, of the clamping-plate are in each formed by lateral extensions from the edges of the said parts of the metal of which the same are made.

Attached in any suitable manner to the lower inner surface of the plate $a$ is a thickness, $x$, of india-rubber or equivalent elastic material. Fixed to the upper inner surface of said clamping-plate is a spring, $f$, which, pressing against the lever $c$, tends to force the same outward to the open position shown in Fig. 3. The band A being placed upon the leg, as hereinbefore explained, the clamp D, open as indicated in Fig. 3, is thrust downward to bring the upper edge of the stocking between the plate $a$ and the clamping-plate $b$, which done the lever is forced downward, causing its turned edge $a^2$ to act upon and force the clamping-plate toward the plate $a$, thereby engaging or clamping the stocking and holding the same until the lever is again turned outward, as shown in Fig. 3, allowing the spring $f$ to automatically move the clamping-plate away from the plate $a$.

It will be seen that the strap B, being pendent, elastic, and adjustable, enables the stocking to be held up without exerting undue strain either upon the stocking or upon the suspensory device itself, and without necessitating any injurious tightness upon the limb; also, that the layer of elastic material $x$, acting as a cushion, insures the griping action of the clamp, whether within certain limits the fabric of the stocking be of greater or less thickness, and without injury in any event to such fabric; also, that the spring $f$, by automatically opening the clamp when the lever is turned outward or upward, materially facilitates the application of the device to the uses for which it is designed.

The clamp may, on occasion, be applied to analogous suspensory devices—for example, to ordinary suspenders, so termed—and also, when desired, to elastic straps pendent from a band placed about the waist and depending parallel with the limbs, for connection with the stockings by means of the clamps.

It will be noticed in this invention that the upper end of the pendent portion of the supporter always remains in the same position with relation to the band part A, which embraces the leg, and strain of the stocking upon the pendant does not cause the upper end of the pendant to change its position or point of junction or contact with the encircling band A, and consequently excessive strain upon the pendant does not contract the encircling band as it might if the pendant were free to move through a ring connected with one end of the said band A, as has been done.

That part of the band A between the fastening devices is made of greater or less length, according to the length of garter required to surround the leg of the person to wear the garter; and the fastening devices, being once engaged, secure the garter about the leg and hold it without liability of expansion or contraction, except that due to the elasticity of the band.

I claim—

1. As an improved article of manufacture, a garter or stocking-supporter composed of the band A, and fastening devices to fasten and hold it together about the leg, the pendant, and a connected stocking holding or engaging clasp to hold up the stocking, substantially as described.

2. The combination, with the pendent strap B, or its equivalent, of the plate *a*, clamping-plate, and lever, the whole arranged for operation substantially as and for the purpose specified.

3. The combination, with the plate *a*, clamping-plate, and lever, of spring *f*, substantially as and for the purpose specified.

4. The plate *a* and its layer *x* of elastic material, combined with the clamping-plate and means to operate it, substantially as described.

WILLIAM S. WARDWELL.

Witnesses:

L. W. REDINGTON,

E. A. MERRILL.